US010510132B2

(12) United States Patent
Davis et al.

(10) Patent No.: US 10,510,132 B2
(45) Date of Patent: *Dec. 17, 2019

(54) VEHICLE FLEET MANAGEMENT METHOD AND SYSTEM WITH LOAD BALANCING

(71) Applicant: Creative Mobile Technologies, LLC, Long Island City, NY (US)

(72) Inventors: Jesse H. Davis, Demarest, NJ (US); John J. Backof, II, Westchester, PA (US)

(73) Assignee: CREATIVE MOBILE TECHNOLOGIES LLC, Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,475

(22) Filed: Aug. 21, 2018

(65) Prior Publication Data

US 2018/0357737 A1 Dec. 13, 2018

Related U.S. Application Data

(63) Continuation of application No. 12/171,372, filed on Jul. 11, 2008, now Pat. No. 10,083,493.

(51) Int. Cl.
*G06Q 50/30* (2012.01)
*H04L 29/08* (2006.01)
(Continued)

(52) U.S. Cl.
CPC .............. *G06Q 50/30* (2013.01); *G08G 1/20* (2013.01); *H04L 67/145* (2013.01); *H04L 67/18* (2013.01);
(Continued)

(58) Field of Classification Search
CPC ....... H04L 67/14; H04L 67/145; G06Q 50/30; G07C 5/06; G07C 5/08; B60R 25/33; B60R 25/102
See application file for complete search history.

(56) References Cited

U.S. PATENT DOCUMENTS 5,428,546 A  6/1995 Shah et al.
5,594,650 A  1/1997 Shah et al.
(Continued)

OTHER PUBLICATIONS

Sang, et al., Coordinated Load Balancing, Handoff/Cellsite Selection, and Scheduling in Multicell Packet Data Systems, MobiCom '04, Sep.-Oct. 2004, pp. 302-314.*

*Primary Examiner* — Daniel Vetter
(74) *Attorney, Agent, or Firm* — Klintworth & Rozenblat IP LLP; Eric D. Cohen

(57) ABSTRACT

A method utilizing real-time location information in a fleet management system. Simultaneous wireless communication connections are maintained between a respectively corresponding number of vehicles in a fleet and a central control center. The messages are received at the central control center, and each one of the messages includes information indicating the geographic location of a respectively corresponding vehicle in real-time or near real-time. The messages are collected and stored in the central control center. In response to a user request, a fleet management tool or report is provided in real-time or near real-time, the management tool or report being based at least in part on the messages indicating the geographic location of the vehicles.

21 Claims, 15 Drawing Sheets

(51) Int. Cl.
  *G08G 1/00* (2006.01)
  *G07C 5/00* (2006.01)
  *G07C 5/06* (2006.01)

(52) U.S. Cl.
  CPC .............. *H04L 67/28* (2013.01); *G07C 5/008* (2013.01); *G07C 5/06* (2013.01)

(56) References Cited

U.S. PATENT DOCUMENTS

| | | | |
|---|---|---|---|
| 5,636,122 A | 6/1997 | Shah et al. |
| 5,758,313 A | 5/1998 | Shah et al. |
| 5,884,216 A | 3/1999 | Shah et al. |
| 5,904,727 A | 5/1999 | Prabhakaran |
| 5,922,040 A | 7/1999 | Prabhakaran |
| 6,088,648 A | 7/2000 | Shah et al. |
| 6,240,362 B1 | 5/2001 | Gaspard, II |
| 6,339,745 B1 | 1/2002 | Novik |
| 6,456,207 B1 | 9/2002 | Yen |
| 6,850,153 B1 | 2/2005 | Murakami et al. |
| 8,140,358 B1 | 3/2012 | Ling et al. |
| 8,484,370 B1 | 7/2013 | Coffee et al. |
| 10,083,493 B1 * | 9/2018 | Davis ................ G06Q 50/30 |
| 2002/0057678 A1 | 5/2002 | Jiang et al. |
| 2002/0156576 A1 | 10/2002 | Annett et al. |
| 2002/0186144 A1 | 12/2002 | Meunier |
| 2003/0229559 A1 | 12/2003 | Panttaja et al. |
| 2004/0039504 A1 | 2/2004 | Coffee et al. |
| 2004/0177109 A1 | 9/2004 | Lee |
| 2004/0254698 A1 | 12/2004 | Hubbard et al. |
| 2005/0152286 A1 | 7/2005 | Betts et al. |
| 2005/0171692 A1 | 8/2005 | Hamblen et al. |
| 2005/0271051 A1 | 12/2005 | Holloway et al. |
| 2006/0074702 A1 | 4/2006 | Schuette et al. |
| 2006/0190280 A1 | 8/2006 | Hoebel et al. |
| 2006/0288101 A1 | 12/2006 | Mastrodonato et al. |
| 2007/0038759 A1 | 2/2007 | Hanson et al. |
| 2007/0230374 A1 | 10/2007 | Altberg et al. |
| 2008/0040244 A1 | 2/2008 | Ricciuti et al. |
| 2008/0122656 A1 | 5/2008 | Carani et al. |
| 2009/0067331 A1 | 3/2009 | Watsen et al. |
| 2009/0080453 A1 | 3/2009 | Stirbu |

* cited by examiner

Tripsheet Report

MIDTOWN OPERATING CORP From 5/19/2008 12:00:00 AM to 5/19/2008 11:59:50 PM

5/20/2008

| House Num | Med. | Driver | Hack | Trip | Pickup Date | Drop off Date | Pmt | Total | Net | Due | Store | Shift | Shift Start Date | Shift End Date | Batch | Batch Date | CC Status |
|---|---|---|---|---|---|---|---|---|---|---|---|---|---|---|---|---|---|
| 702 | 5H12 | ALEJANDRO, TORRES | 428552 | 2311 | 5/19/2008 6:35:55 AM | 5/19/2008 6:44:00 AM | AX | $8.00 | $7.65 | $7.60 | | 1 | 2057330 | 5/19/2008 6:23:34 AM | 5/19/2008 4:24:49 AM | 515 | 5/20/2008 | Settled 5/19/2008 6:35:55 AM |
| Pickup: 390 E 87th St New York Ny 10128 | | | | Drop off: 90 W 81St New York Ny 10024 | | | | Time 8.07 | | Dist. 1.70 | | | | | Pass Cnt: 1 | | | Recvd 5/19/2008 |
| 702 | 5H12 | ALEJANDRO, TORRES | 428552 | 2312 | 5/19/2008 6:45:04 AM | 5/19/2008 6:49:55 AM | AX | $6.30 | $5.98 | $5.99 | | 1 | 2057330 | 5/19/2008 6:23:34 AM | 5/19/2008 4:24:49 AM | 515 | 5/20/2008 | Settled 5/19/2008 6:45:04 AM |
| Pickup: 90 W 81St New York Ny 10124 | | | | Drop off: 200 W 60th St New York Ny 10123 | | | | Time 4.85 | | Dist. 1.30 | | | | | Pass Cnt: 1 | | | Recvd 5/19/2008 |
| 702 | 5H12 | ALEJANDRO, TORRES | 428552 | 2313 | 5/19/2008 6:51:01 AM | 5/19/2008 7:05:08 AM | MC | $17.60 | $17.00 | $16.72 | | 1 | 2057330 | 5/19/2008 6:23:34 AM | 5/19/2008 4:24:49 AM | 515 | 5/20/2008 | Settled 5/19/2008 6:51:01 AM |
| Pickup: 200 W 60th St New York Ny 10123 | | | | Drop off: 660 W 168th St New York Ny 10032 | | | | Time 14.12 | | Dist. 6.20 | | | | | Pass Cnt: 1 | | | Recvd 5/19/2008 |
| 702 | 5H12 | ALEJANDRO, TORRES | 428552 | 2314 | 5/19/2008 7:14:20 AM | 5/19/2008 7:28:38 AM | $ | $14.50 | | $13.78 | | | 2057330 | 5/19/2008 6:23:34 AM | 5/19/2008 4:24:49 AM | | | Recvd 5/19/2008 7:14:20 AM |
| Pickup: 610 W 136th St New York Ny 10031 | | | | Drop off: 440 W 46th New York Ny 10036 | | | | Time 14.30 | | Dist. 5.20 | | | | | Pass Cnt: 1 | | | |
| 702 | 5H12 | ALEJANDRO, TORRES | 428552 | 2315 | 5/19/2008 7:40:20 AM | 5/19/2008 7:53:27 AM | $ | $8.90 | | $8.46 | | | 2057330 | 5/19/2008 6:23:34 AM | 5/19/2008 4:24:49 AM | | | Recvd 5/19/2008 7:40:22 AM |
| Pickup: 288 Amsterdam Ave New York Ny 10023 | | | | Drop off: 450 Park Ave New York Ny 10022 | | | | Time 13.10 | | Dist. 1970 | | | | | Pass Cnt: 1 | | | |
| 702 | 5H12 | ALEJANDRO, TORRES | 428552 | 2316 | 5/19/2008 7:58:25 AM | 5/19/2008 8:17:57 AM | $ | $28.65 | | $27.22 | | | 2057330 | 5/19/2008 6:23:34 AM | 5/19/2008 4:24:49 AM | | | Recvd 5/19/2008 7:58:26 AM |
| Pickup: 199 E 62nd St New York Ny 10021 | | | | Drop off: Foot Br @ Grand Central Pky New | | | | Time 19.52 | | Dist. 10.50 | | | | | Pass Cnt: 1 | | | |
| 702 | 5H12 | ALEJANDRO, TORRES | 428552 | 2317 | 5/19/2008 8:40:28 AM | 5/19/2008 8:56:54 AM | MC | $14.52 | $14.03 | $13.79 | | 1 | 2057330 | 5/19/2008 6:23:34 AM | 5/19/2008 4:24:49 AM | 515 | 5/20/2008 | Settled 5/19/2008 8:40:28 AM |
| Pickup: 4020 21st St Queens Ny 11101 | | | | Drop off: 17 Maspeth Ave Brooklyn Ny 11211 | | | | Time 16:42 | | Dist. 3.30 | | | | | Pass Cnt: 1 | | | Recvd 5/19/2008 |
| 702 | 5H12 | ALEJANDRO, TORRES | 428552 | 2318 | 5/19/2008 9:03:40 AM | 5/19/2008 9:39:13 AM | $ | $20.10 | | $19.10 | | | 2057330 | 5/19/2008 6:23:34 AM | 5/19/2008 4:24:49 AM | | | Recvd 5/19/2008 9:03:39 AM |
| Pickup: 193 Roebling St Brooklyn Ny 11211 | | | | Drop off: 428 8th Ave New York Ny 10001 | | | | Time 35:55 | | Dist. 5.30 | | | | | Pass Cnt: 2 | | | |
| 702 | 5H12 | ALEJANDRO, TORRES | 428552 | 2319 | 5/19/2008 9:43:49 AM | 5/19/2008 9:49:28 AM | $ | $4.90 | | $4.66 | | | 2057330 | 5/19/2008 6:23:34 AM | 5/19/2008 4:24:49 AM | | | Recvd 5/19/2008 9:43:48 AM |
| Pickup: 463 8th Ave New York Ny 10001 | | | | Drop off: 670 W 34th St New York Ny 10001 | | | | Time 5:85 | | Dist. 0.60 | | | | | Pass Cnt: 3 | | | |
| 702 | 5H12 | ALEJANDRO, TORRES | 428552 | 2320 | 5/19/2008 10:02:27 AM | 5/19/2008 10:09:12 AM | $ | $5.70 | | $5.42 | | | 2057330 | 5/19/2008 6:23:34 AM | 5/19/2008 4:24:49 AM | | | Recvd 5/19/2008 10:02:27 AM |
| Pickup: 340 W 48th St New York Ny 10036 | | | | Drop off: 388 Penn Plz New York Ny 10001 | | | | Time 6.43 | | Dist. 1.00 | | | | | Pass Cnt: 2 | | | |
| 702 | 5H12 | ALEJANDRO, TORRES | 428552 | 2321 | 5/19/2008 10:21:42 AM | 5/19/2008 10:55:06 AM | AX | $33.62 | $32.72 | $31.94 | | 1 | 2057330 | 5/19/2008 6:23:34 AM | 5/19/2008 4:24:49 AM | 515 | 5/20/2008 | Settled 5/19/2008 10:21:45 AM |
| Pickup: 489 8th Ave New York Ny 10001 | | | | Drop off: 340 9th St Brooklyn Ny 11215 | | | | Time 33:38 | | Dist. 10.00 | | | | | Pass Cnt: 2 | | | Recvd 5/19/2008 |
| 702 | 5H12 | ALEJANDRO, TORRES | 428552 | 2322 | 5/19/2008 11:10:11 AM | 5/19/2008 11:21:57 AM | $ | $9.70 | | $9.22 | | | 2057330 | 5/19/2008 6:23:34 AM | 5/19/2008 4:24:49 AM | | | Recvd 5/19/2008 11:10:12 AM |
| Pickup: 420 Flatbush Ave Brooklyn Ny 11201 | | | | Drop off: 83 E Broadway New York Ny 10002 | | | | Time 11:77 | | Dist. 2.60 | | | | | Pass Cnt: 2 | | | |

VEHICLE FLEET MANAGEMENT METHOD AND SYSTEM WITH LOAD BALANCING

This application is a continuation of U.S. patent application Ser. No. 12/171,372, filed Jul. 11, 2008, entitled VEHICLE FLEET MANAGEMENT. Application Ser. No. 12/171,372 is hereby incorporated by reference in its entirety.

FIELD OF THE INVENTION

The present invention relates generally to management of a fleet of motor vehicles. More particularly, the invention relates to fleet management and reporting utilizing real-time or near real-time information relating to the status and location of fleet vehicles.

BACKGROUND

The process of managing a fleet of vehicles for hire, such as taxis and limousines, and the associated business considerations, can be quite cumbersome. For example, for a taxi service that accepts passengers on the street on an ad hoc basis, the driver typically maintains a "trip sheet" which contains relevant information for his shift in the vehicle. The information includes information about each fare—starting location, ending location, time, fare amount, etc. This information has conventionally been captured manually by each fleet owner when the driver returns the vehicle at the end of the shift. It is also used as the basis for settlement between the driver and fleet manager, and the settlement process can be quite extensive and time consuming.

This method of data capture is inefficient and results in data loss, poor reporting, and errors in the basic analysis of trip data. In many locations, the number of vehicles permitted to carry passengers for hire is limited, and it is disadvantageous when the revenue attributable to a vehicle is not maximized.

There have been recent technological advances so that, for example, the location of fleet vehicles can be determined, in real-time or near real-time, and communications provided with passengers in each vehicle. The location information can be used to, for example, retrieve property left behind in a vehicle or identify a vehicle involved in an incident based on location and time of day. When passengers forget property in a vehicle, they typically can only provide the starting location, ending location, and approximate time of the trip. The communications may consist of Internet sessions or e-mail communications. The communications may also consist of advertisements that are initiated by a central distribution point and simultaneously pushed out to the vehicles over wireless communication links to be displayed to the passengers. See, for example, U.S. Pat. No. 7,227,475 issued to Provensano et al.

However, known methods are disadvantageous in several ways. Multimedia files can be quite large and there may be many vehicles in a fleet. The simultaneous or real-time mass distribution of advertisements or other types of multimedia content in a conventional manner to vehicle passengers puts a heavy load on the wireless communications links to the point that is impractical for large fleets. Another disadvantage is that the conventional manner assumes the vehicle is always available, when in fact a vehicle may be out-of-service or otherwise unavailable to receive the distribution at any point in time. The benefits of the conventional system are of relatively limited utility to the manager of the vehicle fleet. It would be advantageous to have methods, systems and software that optimizes the communications in real-time or near real-time in a manner that assists the management of the fleet vehicles. One example of improved management is the capture, communication and processing of data for an electronic trip sheet in real-time or near real-time.

BRIEF SUMMARY

The preferred embodiments of the invention involve methods, systems and software for fleet management. In particular, they avoid the conventional push distribution methodology. Instead, the apparatus in each respective vehicle participates in a unique methodology for sharing information related to fleet management with a central control center. This methodology enables a fleet manager to quickly and easily locate multiple types of information for each of its fleet vehicles, such as its location, its fares for a certain time period (such as a day or a shift), and the driver. In a particular aspect of the preferred embodiments, the information collected from fleet vehicles is securely stored at the central control center and is made available to the fleet manager in real-time or near real-time through a standard web browser.

In one aspect of the system, the fleet manager can view a real-time display of vehicle location and status. This greatly reduces the amount of time necessary to locate and determine the status of fleet vehicles. It offers drivers accurate short and long term outlooks of their shifts, such as determining patterns of the most and least profitable shifts, areas and times of day over long periods of time.

Some preferred embodiments also facilitate precise dispatch services that assist in efforts to efficiently dispatch vehicles to a waiting room full of drivers, as an optional dispatch room screen for drivers to track their assigned vehicles on their way back to the garage. Security PIN-protected log-in features ensure that the proper driver is matched to the vehicle to which they are assigned, helping to protect against theft and unlawful use of vehicles. This information can also be made available to governmental agencies to track stolen vehicles or vehicles involved in accidents.

In another aspect, the preferred embodiments can instantaneously provide electronic trip sheet reports on demand. The fleet manager can also designate the information contained in the electronic trip sheet. For example, they can have a report with only critical information or a comprehensive report with more information. The electronic trip sheet report can be used for quick and easy end-of-shift settlements on lease fees and credit card and debit card fare transactions.

In other aspects, the fleet management system includes a variety of fleet manager reporting features that show productivity patterns and other crucial business information. This helps to improve day-to-day operations and improve revenues.

Some preferred embodiments improve the amount of information available inside the vehicle. A driver interactive unit permits text communication with drivers. Fare and toll information can be provided to passengers in real-time. In particular, the exact amount of a toll can be shown when the vehicle approaches a tollgate. Also, the driver can be prompted to confirm the toll charge to make end-of-shift settlements easier and more accurate.

BRIEF DESCRIPTION OF THE DRAWINGS

In association with the following detailed description of the preferred embodiments, reference will now be made to the accompanying drawings, where like numerals in different figures refer to the same element, and in which:

FIG. 12 is an example of an electronic trip sheet produced for fleet management in accordance with a preferred embodiment of the invention.

FIG. 13 is an example of a trip sheet query tool produced for fleet management in accordance with a preferred embodiment of the invention.

DETAILED DESCRIPTION OF THE PREFERRED EMBODIMENTS

Figure 1:
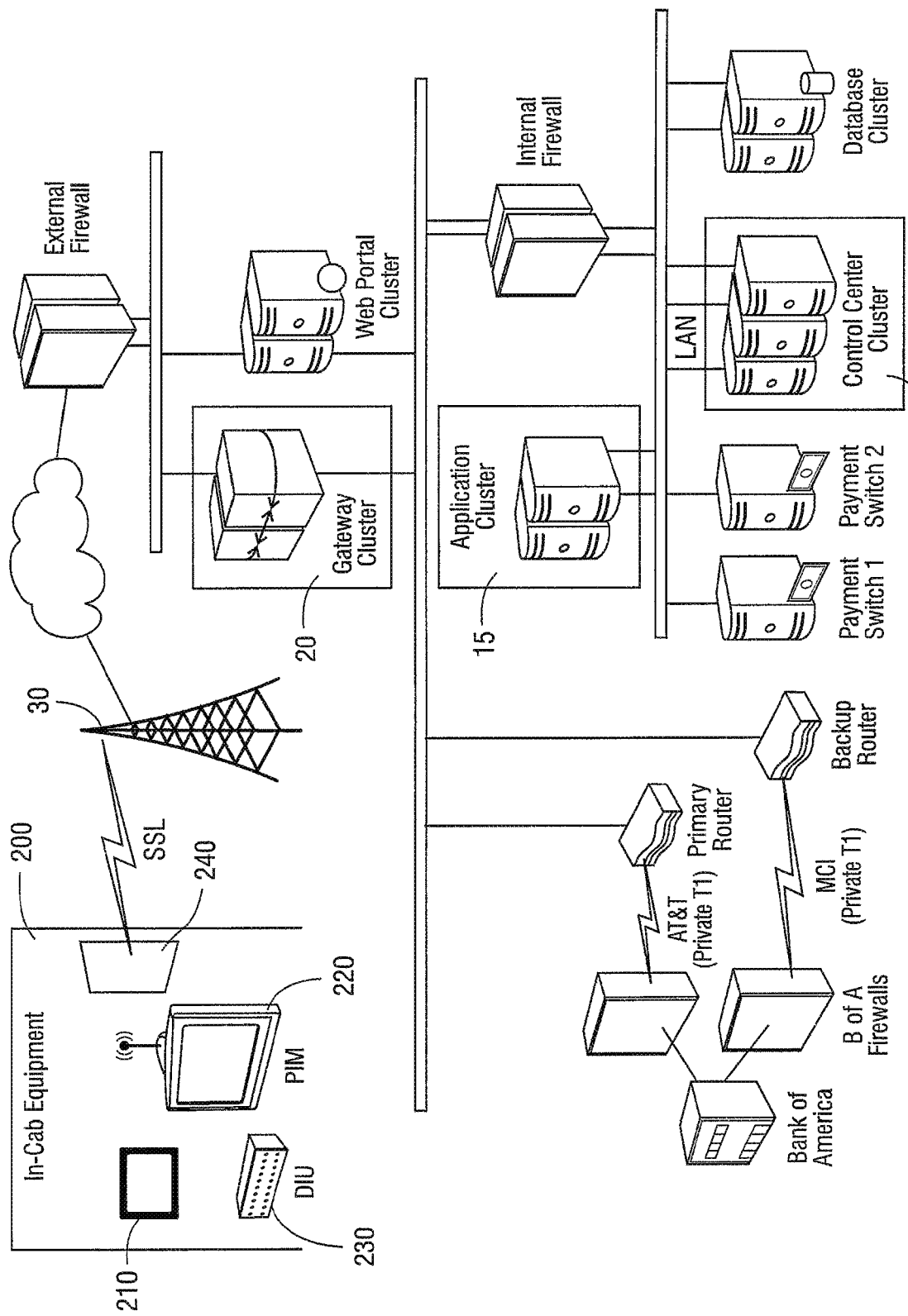
FIG. 1 is an overview of the system including basic security zones, server architecture and communication paths.

Preferred and exemplary embodiments of the present invention now will be described in detail with reference to the accompanying drawings. Referring now to FIG. 1, it shows an overall environment in conjunction with which the preferred embodiments of fleet management may be practiced. The communication system obtains and transmits a plurality of types of information to passengers in a number of vehicles. In addition to the in-vehicle components described below, the system further includes a central control center 10, a gateway 20, and a wireless service provider 30. The wireless service provider 30 is the distribution network for providing information to and from each of the vehicles 200. The wireless service provider 30, gateway 20 and the central control center 10 are configured to be able to handle a large number of simultaneous communication channels from a plurality of vehicles 200. There may also be at least one content provider (not shown in FIG. 1), providing content to be controllably distributed to the plurality of vehicles 200.

Gateway 20 is a messaging gateway that communicates and maintains connections with each vehicle 200. Central control center 10 is the message processing application for all inbound and outbound communication with PIM 220. It must guarantee delivery of all messages to and from gateway 20, and must capture and store all messages for debugging and auditing purposes, including text messages which are delivered, undelivered, responses errors, etc. Central control center 10 only accepts messages from gateway 20 over a secure intranet or Virtual Private Network (VPN) and should reject messages from invalid sources. Central control center 10 and gateway 20 should preempt any other message for all emergency messages. Central control center 10 provides an interface to monitor health of the communication system both next to real-time and historical reporting. Monitoring data to be provided includes gateway queue sizes (in/out), central control center queue sizes (in/out), gateway connections, messages per second and total error messages.

Additionally, the system includes a locationing system whereby the geographical location of each respective vehicle 200 can be determined. The locationing system may be provided by the wireless service provider 30, or by a separate Global Positioning System (GPS), or by a combination of both. The position of each vehicle is provided to the central control center 10 in real-time or near real-time.

Furthermore, central control center 10 must capture all shift data (such as logon, logoff, power on, power off, etc.) from the vehicles, and all messages relating to shift and fares. It must also capture trip records, vehicle identification and owner identification data, trip identification and authorization limit (on-line, floor limit), vehicle status (live or out-of-service), captured batches (date, batch number, total fares, total transactions), and fare data (date, trip number, batch number, itemized fare).

In particular, the wireless service provider 30 receives the payment information from passengers, forwards it to a credit card processor, and selectively returns a verification that the payment was successfully made. The wireless service provider 30 provides a plurality of other communication functions, such as text messages and Internet access to passengers in a plurality of vehicles.

Typically, a fleet vehicle 200 is equipped with a meter 210, a passenger information monitor (PIM) 220, a driver interactive unit (DIU) 230 and a wireless communication device 240. The PIM 220 is coupled to the central gateway through wireless communication device 240, and provides information to the passenger such as for example fleet logos, driver identification, and a map information. Further, the PIM 220 may display media content, such as advertising, to the passenger. The media content may be streamed through wireless communication device 240, stored in the vehicle 200, or any combination of the two, such as being downloaded through wireless communication device 240 and cached in vehicle 200. Optionally, meter 210 is connected to PIM 220 so as to display fare and toll information.

PIM 220 is, for example, a mobile computer comprising an integrated touch screen display recessed into a partition and directly viewable by a passenger positioned in a passenger seat, and a card reader for receiving information from a credit card or debit card. During the trip, PIM 220 allows passengers to track their journey on one of several maps with different views and to monitor tolls and surcharges. The passenger may also watch media on the touch screen display, and in some embodiments, optionally use the PIM 220 to access the Internet via wireless communication 240 and a wireless network (not shown). At the end of the trip, PIM 220 enables the passenger to pay the fare by credit card or debit card, optionally including the easy calculation of tips by interaction with the touch screen display.

Preferably, the PIM 220 in each respective vehicle itself initiates polling communications with central control center 10. In these polling communications, the PIM 220 may announce itself and inform the central control center of its software version, advertising version and other important operating parameters. PIM 220 can then be updated as desired. These polling communications do not occur at points in times that are in common with other vehicles in the fleet. For example, polling communications can be made to occur periodically and/or whenever PIM 220 is powered on or otherwise comes on-line. Since the PIMs 220 of each vehicle in the fleet will generally be powered on or come online at different times, the polling communications and the updates will occur at different times for different vehicles. For periodic polling communications, different vehicles can perform its polling communication at different times. For example, if a polling communication is to be made once per hour, some vehicles can perform polling communications at one minute past the hour (i.e., at 8:01, 9:01, etc.) while other vehicles perform its polling communications at six minutes past the hour (i.e., at 8:06, 9:06, etc). Preferably, PIM 220 is configurable or programmable to operate as described herein to support multiple polling communications with different parameters.

All polling communications need not be the same and updates in response to polling communication need not be handled in the same manner. In particular, the polling communications and updates related to fleet management may be handled differently than other kinds of updates. While news or other kinds of multimedia content may be time sensitive and need to be updated immediately, all updates need not occur immediately after the polling communication. For software updates and other updates that will not be utilized until the PIM 220 is powered off and then on again, the update may be downloaded over a period of time. For polling communications related to time sensitive updates, such as news, the update need not be delivered directly from the central control center, but the central control center 10 may, in response to the polling communication, indicate from where PIM 220 may obtain the update. When the update is complete, PIM 220 reports back the completion to central control center 10.

Figure 9:
FIG. 9 is an example of the inventory of PIM update status in accordance with a preferred embodiment of the invention.
Figure 10:
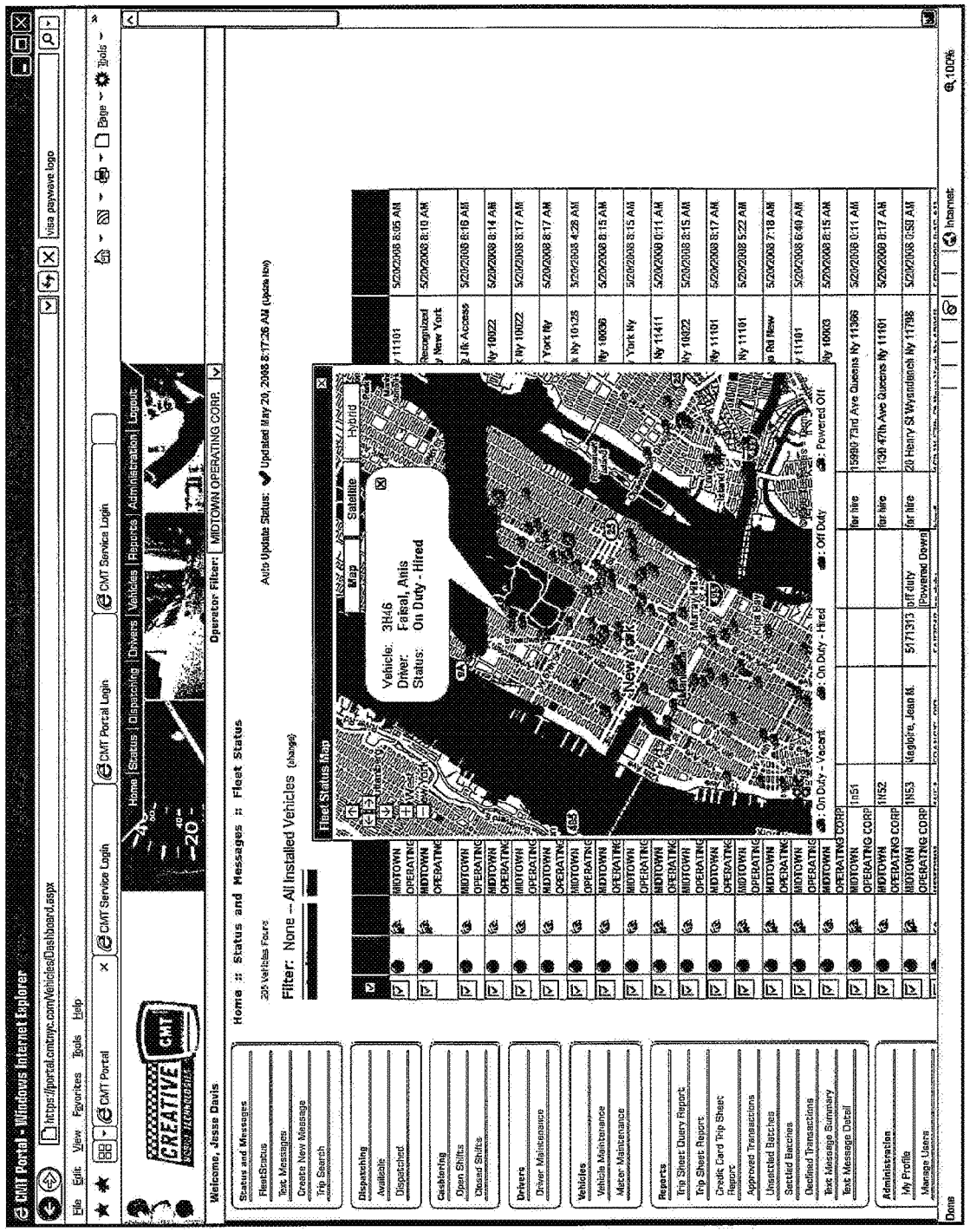
FIG. 10 is an example of a real-time or near real-time status map for a vehicle fleet in accordance with a preferred embodiment of the invention.

Central control center 10 keeps an inventory of each PIM 220 in the vehicle fleet and its respective update and download status. An example of a PIM configuration available through the web portal according to a preferred embodiment is shown in FIG. 9. It has a snapshot of the current status of all updates; software, daily content updates, full look replacements, ticker, and miscellaneous updates. A vehicle may be out-of-service for three days and not make any polling communications during that time. The central control center 10 will track this, and provide missed updates, and may also skip updates that are no longer appropriate to provide because they are untimely, or are superceded by other updates, etc., to manage the PIM 220. However, unlike the previous broadcast distribution, it is incumbent upon each one of the PIMs 220 to check in with the central control center 10 and update itself.

On the other hand, other updates, DIU 230 allows the driver to log on and off the system by using a secure PIN. It also the driver's primary tool for interacting with the PIM 220 and particularly, for assisting passengers with credit card and debit card payments. It is preferably a small multi-functional box that is installed to the right side of the steering wheel in close reach and easily viewable from the driver's seat. It features easy to use buttons that correspond to various responses that appear on the screen—depending upon the action that is currently taking place in the vehicle. For example, the driver may facilitate payment transactions by selecting the buttons that correspond to simple responses like "yes" and "no" in response to questions like "are all amounts entered correct?"

DIU 230 is optionally coupled to other devices for displaying messages and may display messages from the fleet manager and, optionally, governmental agencies. Some text messages require no responses and others will prompt the driver to respond using pre-set responses on DIU 230. Pre-defined text messages can also be sent from the driver to the fleet.

It is known that a content provider, such as an advertiser or media distributor, may provide content to be made available for display on PIM 220. The content provider may provide media content, as for example advertisement images and/or text such as news, as well as instructions for distribution of the content. However, the preferred embodiments utilize PIM 220 to determine the playback or other aspects associated with the content. For example, the multimedia content is sent out with activation criteria, such as time or geographic data, so that when the vehicle and PIM 220 satisfy the activation criteria, the content is activated without the need for further interaction with central control center 10. This avoids the disadvantage that the content needs to be downloaded from a central distribution point at the specified time or when the vehicle enters the specified geographic area, in which temporary interruptions in the communication system may disrupt the download, making the preferred embodiments more reliable. There may be information recorded in central control center 10 indicating the number of vehicles and/or time that content has been played. In some embodiments, the passenger may have the ability to override the display of the media content, and the system preferably records the approximate amount of time that content is displayed to passengers.

The fleet management is broken into several application components. A customer facing component runs on the PIM 220. The gateway and central control center application components work in tandem to service all messages to and from PIM 220. These messages include trip sheet data, credit card processing messages and AVL messages for spatial queries. Additionally, the central control center 10 utilizes payment processing switches to facilitate secure, reliable credit card processing. Finally, Web Portal and Shared Services application components are used to display and report on all captured data within the system.

Gateway

The gateway application component is a multi-threaded IP socket-based listener which accepts and maintains persistent connections with PIMs 220. Once a socket connection has been established, the gateway 20 is responsible for storing and forwarding all messages both to and from the PIM 220. The gateway preferably guarantees delivery of messages and employs a message queuing technique similar to that of an SMTP mail server.

The gateway 20 also monitors the connection status of PIMs 220 and forwards messages to the central control center 10 based on those connections. This constant monitoring ensures that the central control center 10 knows which PIM 220 is connected to which gateway 20 for proper outbound message delivery. If the gateway 20 sees that a socket connection has been terminated or that it's been inactive for an extended period of time, it will tear down the socket connection and notify the central control center 10.

Figure 2:
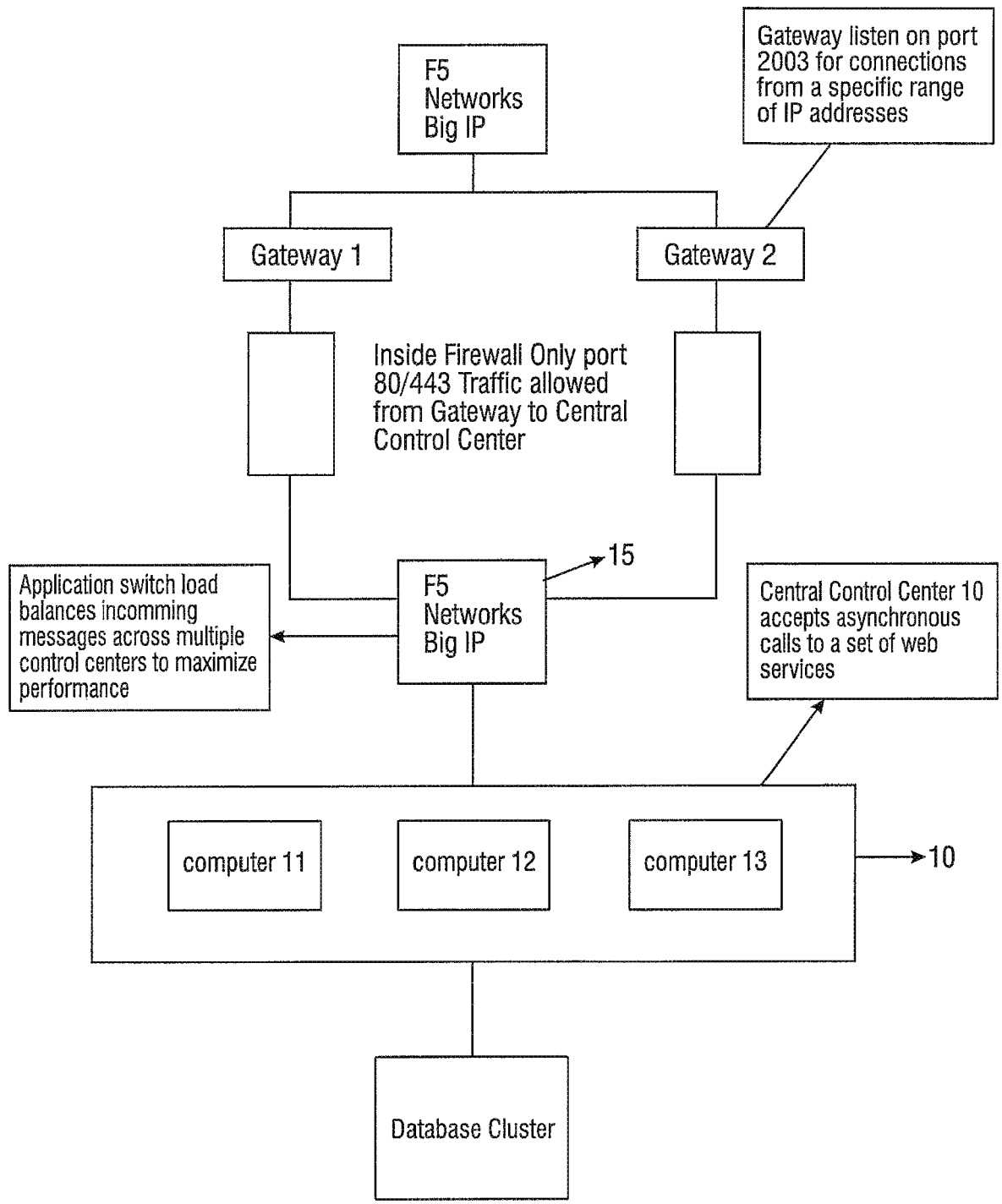
FIG. 2 is a diagram of how a central control center interacts with a gateway and a database cluster in a preferred embodiment of the invention.

The gateway 20 is preferably fronted by application switches 15 as shown in FIG. 2, such as the BigIP Application Switch commercially available from F5 Networks of Seattle, Wash. The application switches 15 load balance gateways 20 and ensure maximum uptime. Although multiple gateways 20 are present, to each one of the PIMs 220, only one gateway 20 is visible. This gateway 20 exists as a virtual IP Address on the redundant pair of application switches 15. The application switches 15 determine (based on current loads), which gateway 20 will be used to service requests from PIMs 220. This design allows the fleet management system to quickly and easily bring up more gateways as traffic increases. Additionally, gateways can be brought offline and upgraded with no service interruption.

Central Control Center

FIG. 2 shows a high level overview of how the central control center 10 interacts with the gateway 20 and the database cluster. The central control center 10 is comprised of a cluster of computers 11, 12 and 13. All messages from the gateway 20 are packaged as SOAP messages and forwarded to the application switches 15. Once the messages are received at the application switches 15, the application switches 15 will determine which computer, 11, 12 and 13, is currently processing the least number of messages and send the message to that computer 11. Once the message is received, the computer 11 will determine the message type, decode it and process the message. If the message requires a response or the message was initiated internally, the computer 11 will send a message to PIM 220 through the gateway 20 which holds its connection. This communication is possible because of a routing table kept by the gateway 20. If the message is undeliverable, the central control center 10 will try to resend the message once the routing table has been updated and the PIM 220 connected.

The central control center 10 is preferably implemented as a series of web services which enable high levels of scalability through standard application switching techniques. Also by using application switches, individual computers 11, 12 and 13 can be taken off line and serviced while the entire solution is still fully functional. This is made possible by using one more server than is necessary to service the maximum traffic. Additional computers can be introduced quickly and efficiently as needed based on traffic.

Payment Processing

Figure 3:
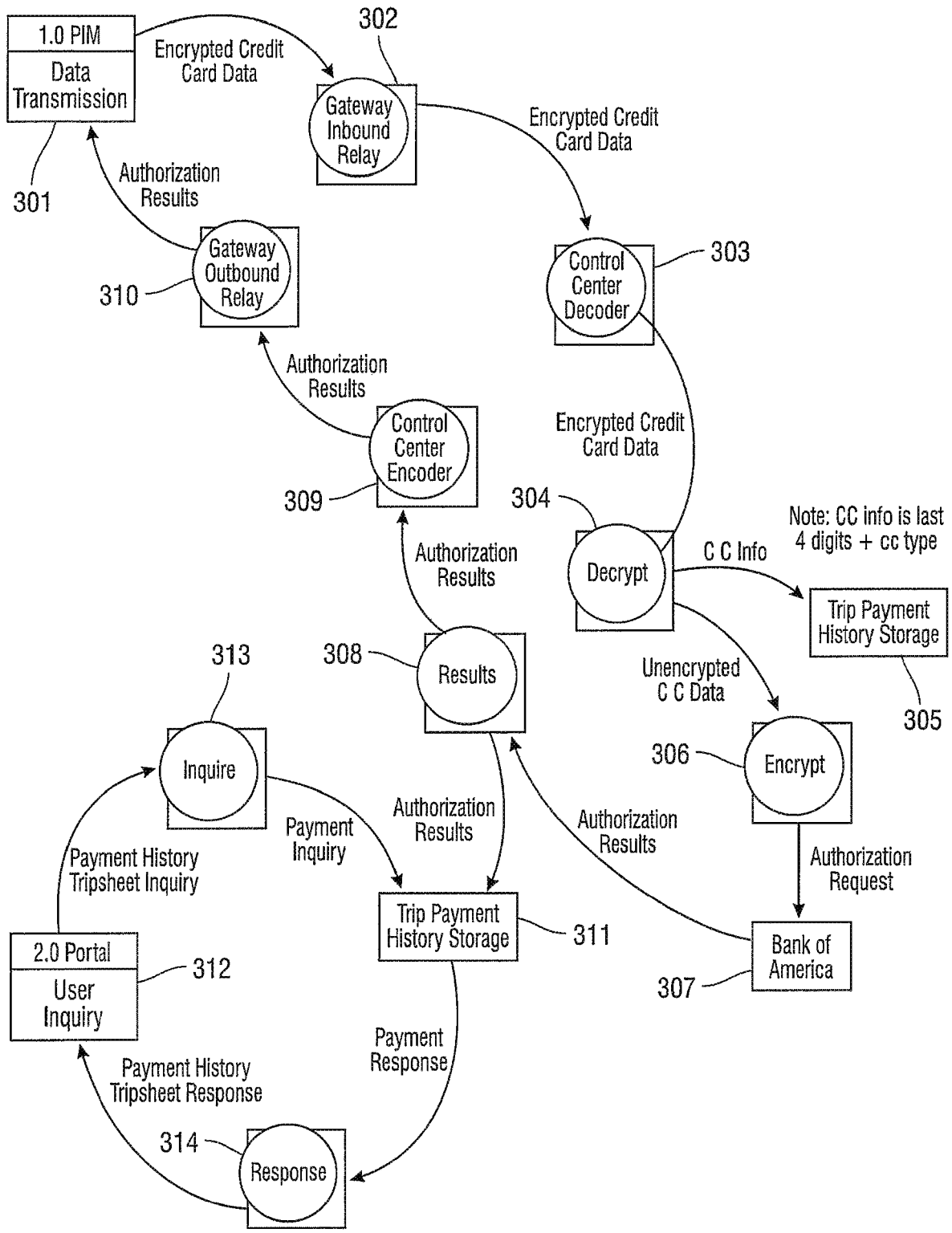
FIG. 3 shows how data flows for credit card processing in a preferred embodiment of the invention.

FIG. 3 shows how data flows for credit card processing from the PIM 220 through the gateway 20 to the central control center 10 and back. The payment processing system is preferably different than the conventional payment processing system, with stronger security and compliance in mind. It is the most secure, robust, payment processing system for the wireless environment. It uses a PCI standards compliant, 3rd party payment switch to ensure maximum uptime and security while simultaneously providing the flexibility to move to different backend processors if necessary. A Payment Processing Switch such as that commercially available from ISD Corporation of Irving, Tex. routes all payment transactions to the appropriate clearing house for authorization and settlement. This PCI compliant switch is installed on multiple servers for failover and redundancy. The central control center 10 identifies a payment switch failure and automatically routes authorization and settlement requests to the appropriate server. Additionally, redundant payment routers sit on the network and connect to redundant payment processor gateways at our current payment processor.

Authorization Process

Figure 4A:
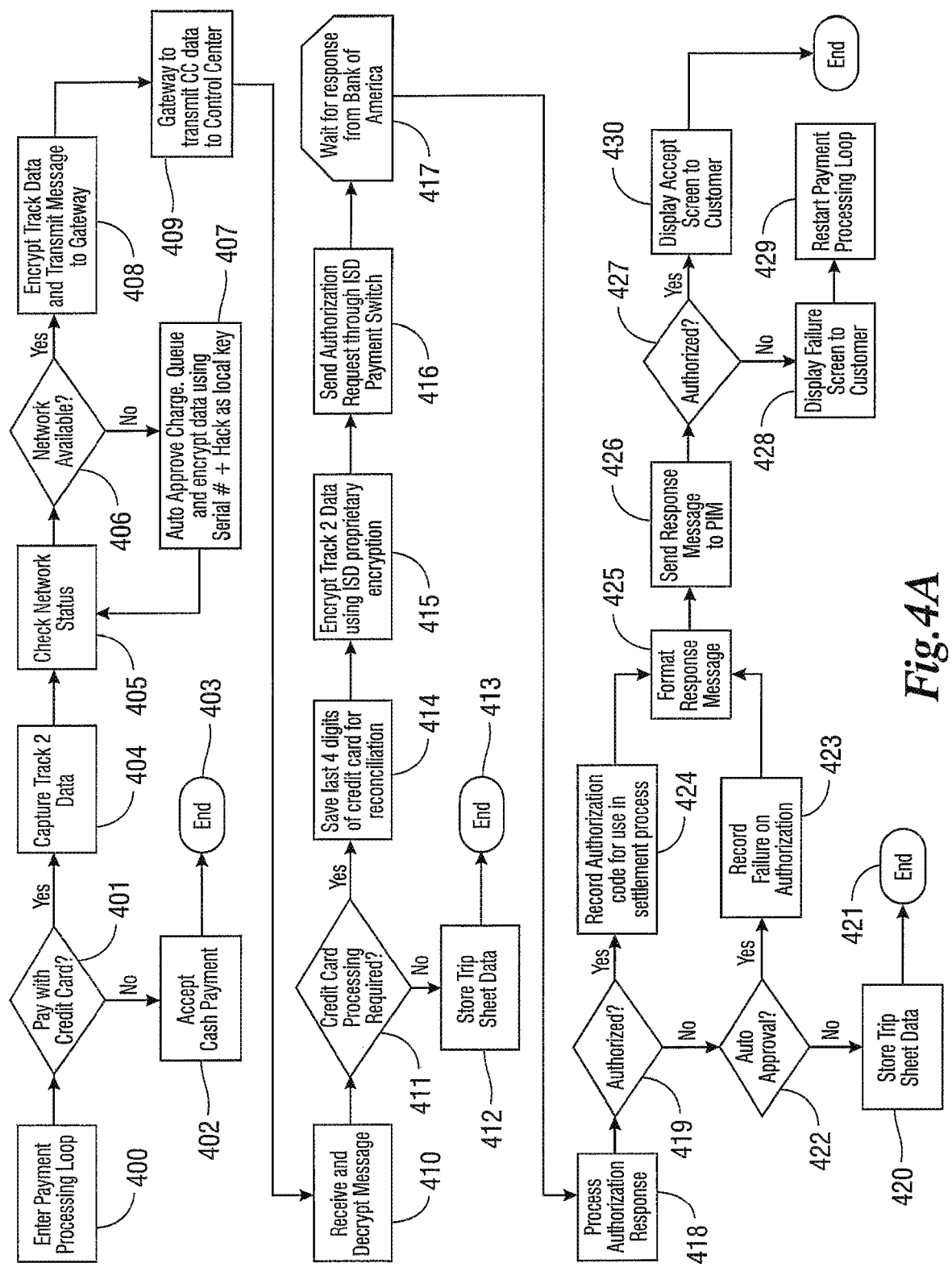
FIG. 4A is a flowchart of the authorization in the preferred embodiment of credit card processing.

FIG. 4A is a flowchart of the authorization process. Preferably, each PIM device does not act as an individual Point of Sale (POS) device sending transactions directly to the processor for authorization and settlement. Rather, all transactions are aggregated in the central control center and are sent through the payment processing switch. In this design, the central control center is acting as the Point of Sale device controlling the authorization and settlement (capture) of credit card transactions.

The central control center controls the flow of data (as a typical POS device would) by encrypting the message into an ISO 8583 compliant structure and sending the request through the payment processing switch to the appropriate authorizer. This design offers a highly flexible payment processing engine while at the same time giving the ability to add additional levels of security to the overall solution. This flexibility allows a higher level of fraud protection to be implemented in the future by analyzing data flow trends and better identifying high risk scenarios.

Additionally, by aggregating transactions through the central control center, there is better control over the flow of settlement records and it is not necessary to rely on the availability of the in cab equipment (PIM 220) to close and settle credit card batches (see settlement description below). The credit card reconciliation process is also enhanced by aggregating transactions through the central control center and providing updates to merchant account holders as to when credit card transactions actually settle.

Settlement and Reconciliation Process

Figure 4B:
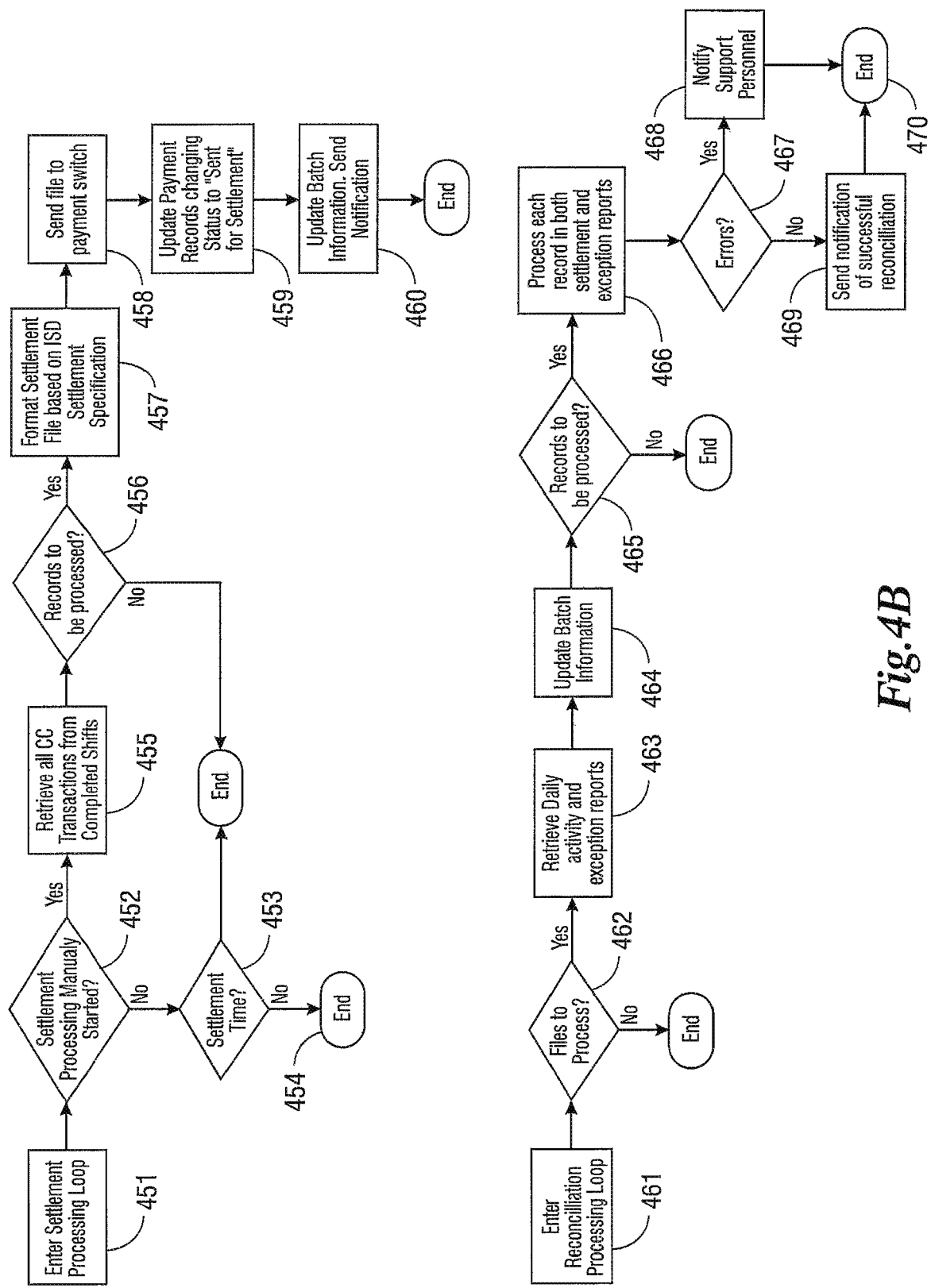
FIG. 4B is a flowchart of the settlement and reconciliation in the preferred embodiment of credit card processing.

FIG. 4B is a flowchart of the settlement and reconciliation process. The settlement process maximizes the number of transactions sent for settlement to facilitate getting batch deposits to merchants as quickly as possible. In order to meet these requirements, it is a flexible settlement system which allows for settlement at any time of the day or any reason (completing shifts, time elapsed, etc. . . . ). However, financial institutions typically process settlement records once each day. A backend processing service, such as that commercially available from Bank of America of Charlotte, N.C. processes records for settlement at a particular time of day, such as 6:00 pm EST. This means that regardless of when settlement files are sent, they are only processed at the designated time. For this reason, a settlement file is only sent once a day slightly before the designated time. By only sending one file, there is greater control over the process and the delivery and proper processing of the settlement file can be better ensured.

The settlement is constructed from all credit card authorizations on completed shifts up to the time the settlement file is sent. Once the file has been confirmed delivered, all records are updated to a "Sent for Processing" status. Once the batch has been processed, the processor creates an Activity Report and an Exception report to indicate the success or failure of records. All records in the system are updated with the status in these reports. Exceptions are logged and support personnel are notified.

Because authorization and settlement are aggregated through the central control center and payment processing switch, it is not necessary to rely on in-vehicle equipment to close shifts and send settlement records to the payment processor. The settlement processing is done completely independent of the vehicle hardware, thus reducing settlement issues and ensuring fast delivery of funds to merchant account holders.

Portal Architecture

Figure 5:
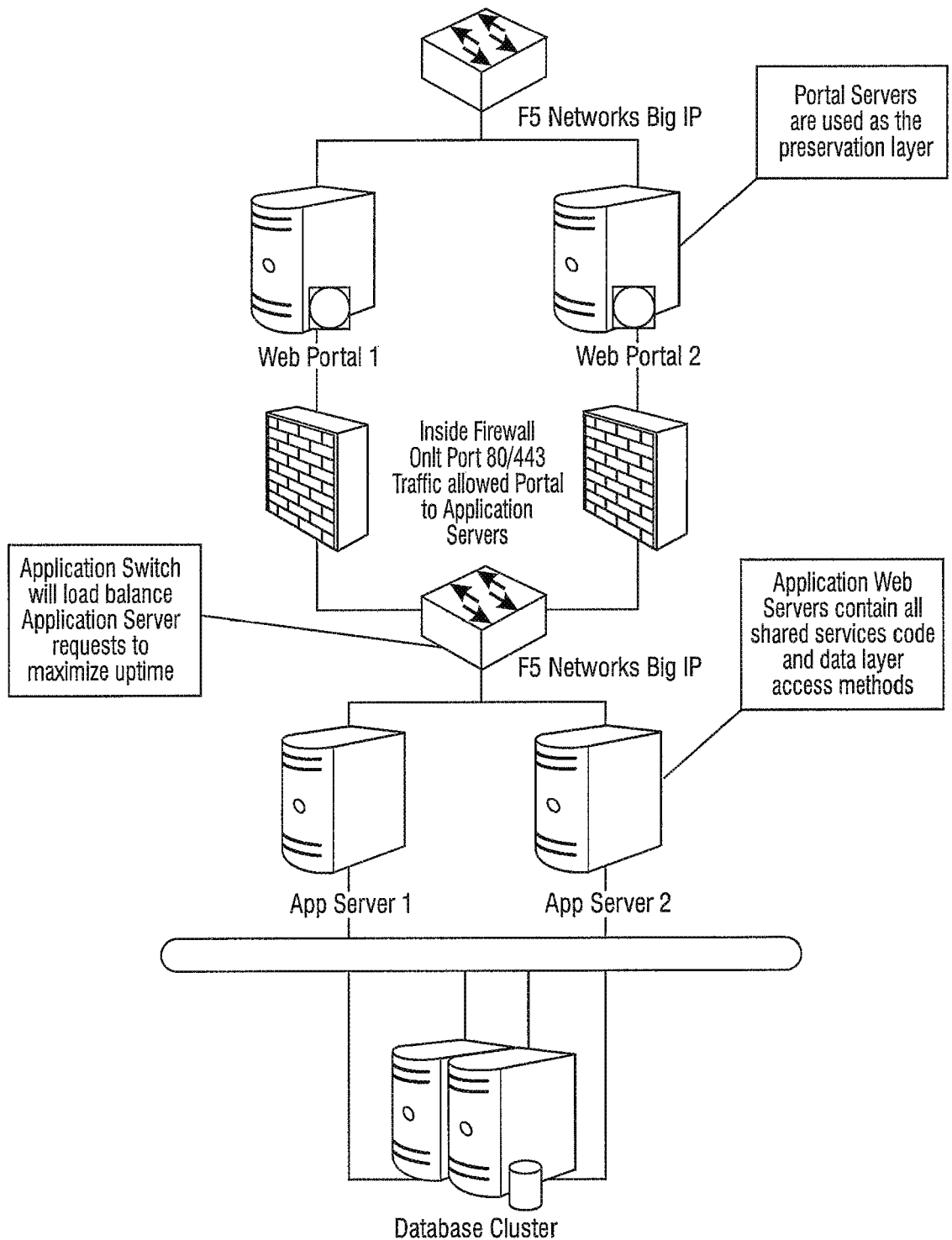
FIG. 5 is a diagram of the architecture of a web portal in a preferred embodiment of the invention.

FIG. 5 shows a preferred portal architecture, which delivers the various fleet management functions via web services. The portal is a secure web based application, which allows users to view all aspects of the solution including trip sheet data, text messages, payment processing status, last known vehicle location and more. All user access is through the Web Portal, which is made secure through SSL (https). It is a multi-tier application utilizing ASP.NET 2.0 as its presentation layer, a series of web services, which wrap the business logic and a separate data layer which encapsulates all data access through stored procedures. Thus, the presentation and interaction with a fleet manager is provided independently of the data processing performed by the central control center 10 and the storage and retrieval of the underlying data in the database cluster.

User interface elements may be based on a control suite, such as the NetAdvantage control suite commercially available from Infragistic of Princeton, N.J. which ensures a high level of functionality while minimizing control defects. This control suite affords rich functionality for end users to manipulate and analyze data.

A key aspect of the web portal is that there is a set of standard business objects, which encapsulate the core business logic described herein. By separating business logic from data access and user interface functions, the management functions available to a fleet manager can be expanded through externally facing web services without the need to re-engineer backend services or replace any preexisting fleet management software.

Figure 6:
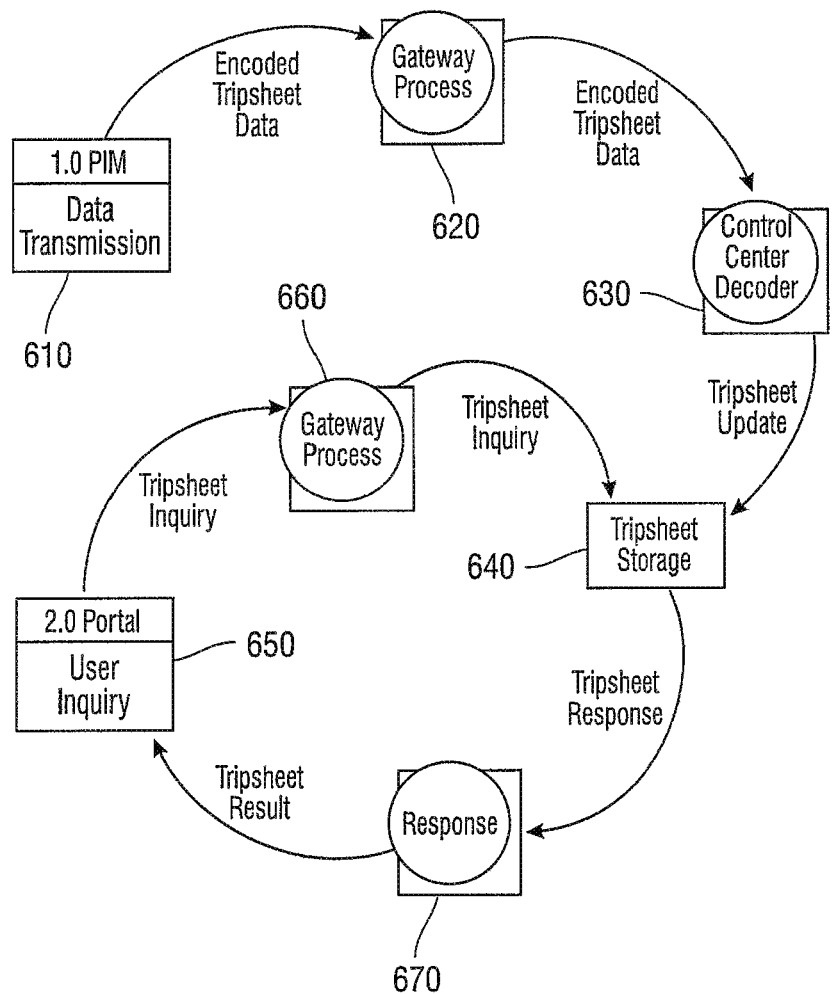
FIG. 6 is an example of the data flow for a trip sheet from a PIM to a communications gateway and to a central control center and back in a preferred embodiment of the invention.

FIG. 6 shows a single data flow of data for an electronic trip sheet from the PIM 220 through the gateway 20 to the central control center and back. The beginning step 610 of the process is the transmission of electronic trip sheet data from the vehicle to the gateway. This step 610 occurs whenever data is desired to be saved, for example, power on/off, driver log on/off, beginning and ending of a trip, passenger status, meter status, etc. at a number of different times. The application data is preferably encoded into a special to provide an extra level of security. Even if someone attempts to intercept the data, such as by pretending to be the receiving gateway, the data will be encoded and hard to use even if obtained. At step 620, gateway 20 receives the encoded trip sheet data, managing the communication session as indicated above, and passes the encoded trip sheet data onto central control center 10.

At step 630, central control center 10 decodes the trip sheet data and stores it at step 640. The data from this transmission and many other trip sheets is stored in its raw form, and is not organized at this point in time in the format that may later be used for a report. When a fleet manager makes an inquiry on the web portal at step 650, a trip sheet inquiry is created. This inquiry is processed at step 660 by the application cluster in central control center 10 and forwarded on to obtain the requisite data related to the inquiry stored at database in step 640. A trip sheet response containing the data to be utilized is returned to central control center 10 at step 670. Central control center 10 generates a trip sheet result and sends it to web portal, which displays it to the fleet manager. The data is not formatted in the trip sheet result sent from step 670. It is the web portal at step 650 that formats the data in the trip sheet result and generates the electronic trip sheet report.

Figure 13:
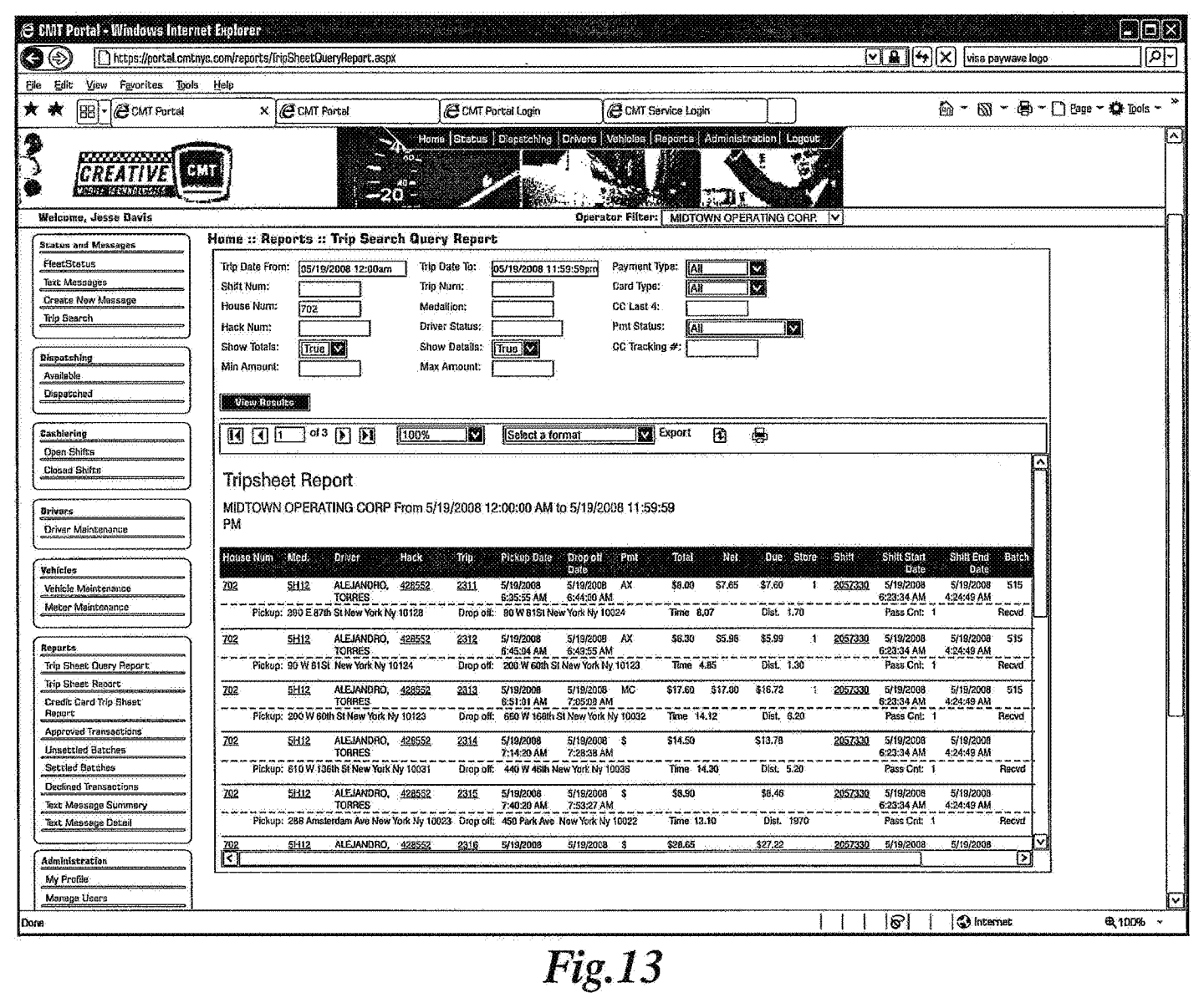

FIG. 12 is an example of the possible content, presentation and format for an electronic trip sheet and FIG. 13 is an example of a trip sheet query tool for a fleet manager. Through the web portal, the fleet manager can select various filters for the trip sheet. Preferably, all of the trip sheet data and the "Last Known Location" information for each vehicle is reverse geocoded. Geocoder data, and an API for its use are commercially available from, for example, TeleAtlas of Lebanon, N.H. A wrapper for the API is customized so that fleet status information can be reverse geocoded upon request, whereas the trip sheet data is reverse geocoded at the time of the trip data transmission shown in FIG. 6.

Figure 7:
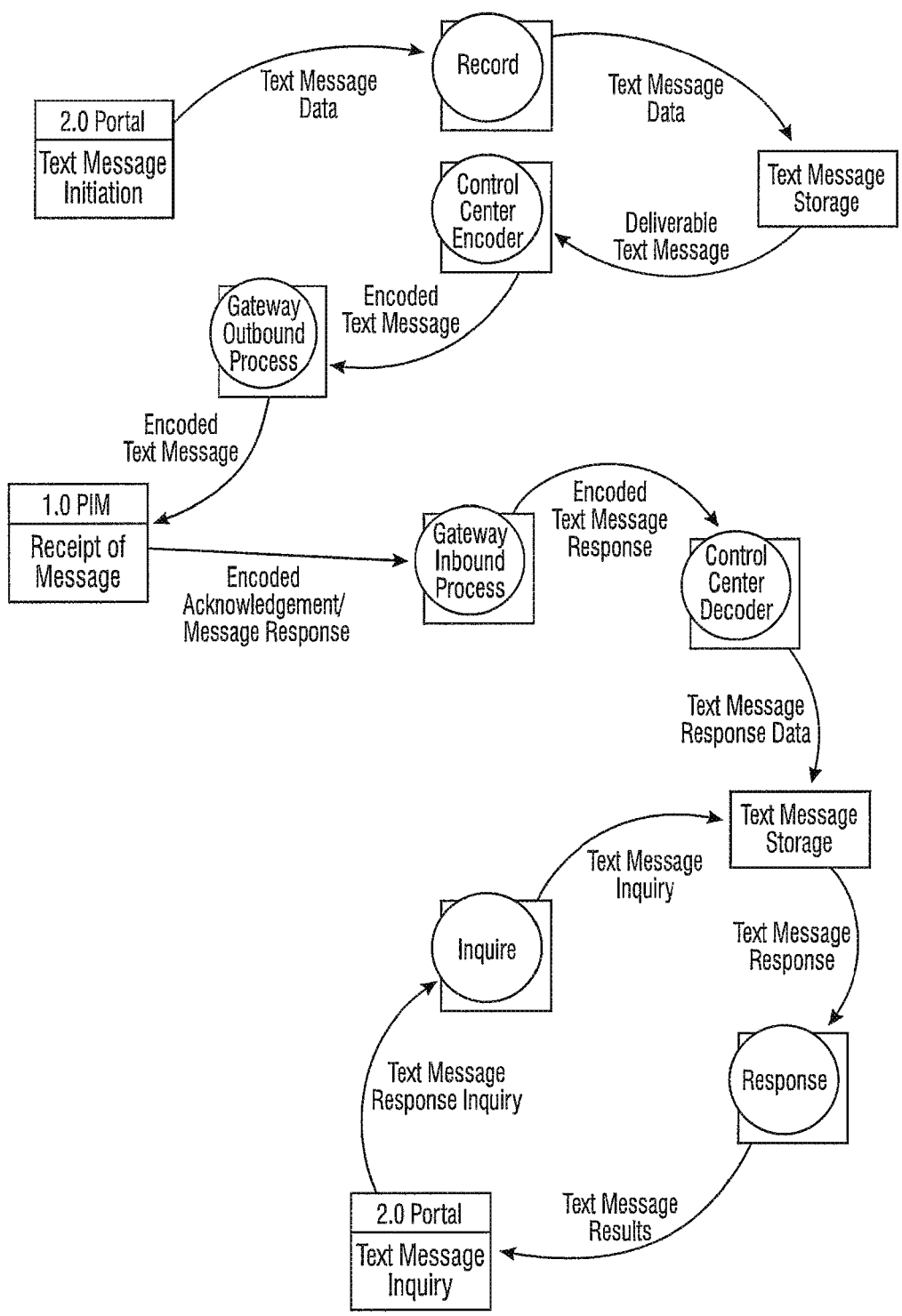
FIG. 7 is an example of the data flow for text messaging in a preferred embodiment of the invention.
Figure 14:
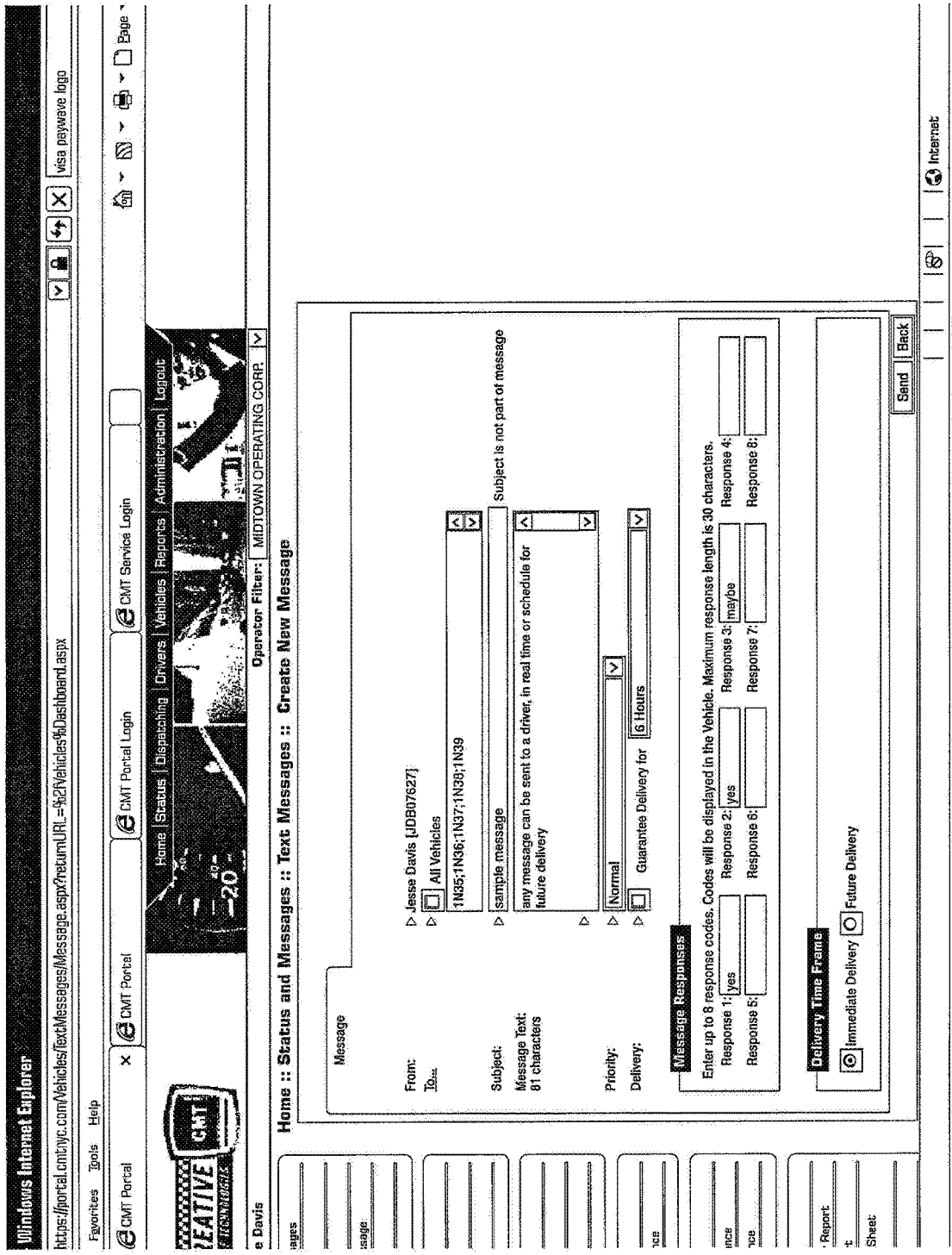
FIG. 14 is an example of a text-messaging interface in accordance with a preferred embodiment of the invention.

FIG. 7 shows how data flows for text messaging to and from the PIM through the gateway to the central control center and back. Text messages can be delivered to an individual vehicle or a group of vehicles through the web based portal. Once the messages are constructed and the recipients selected, the text message will attempt to be queued and delivered via the central control center for immediate delivery or for future delivery with a configurable amount of time. This timeout period is configurable via the web portal and may be set on per-message basis. The timeout period ranges from 6 to 48 hours and if the message is not delivered in this timeframe, the message(s) expires and are permanently archived. Driver response can be provided with a message, prompting the driver to select a response. An example of a text messaging interface for the web portal is shown in FIG. 14.

Database Design and Implementation

The database is a highly scalable and highly available clustered database solution utilizing scalable hardware, such as the 6850 server hardware available from Dell Corporation of Round Rock, Tex. It has great flexibility with regards to expansion, and additional shelves of drives can be added at any time to expand the current databases. A redundant multi-path, multi-device architecture is utilized which can withstand a failure of any one device, disk or switch. Physical storage is provided by a storage area network (SAN), commercially available from EMC Corporation of Hopkinton, Mass. and others.

A preferred embodiment utilizes the Microsoft SQL Server 2005 as the database application. Microsoft SQL Server 2005 uses a variation of SQL called Transact-SQL which is based on the ISO SQL-92 standard. Microsoft SQL Server also has native support for ODBC and XML. Other database applications supporting these features may also be used.

Database and Disk Sizing

Customized databases are created specifically based on the usage, transactional volume and the overall storage requirements necessary to store all necessary data elements. The chart below outlines the databases, descriptions, estimated transaction volumes and the overall size for a fleet of 5,000 vehicles. Additionally, the number of drives selected is a result of the highly transactional nature of the fleet management.

| Database Name | Description | Est. Daily Volume | Est. Size Needed after 9 mo. |
|---|---|---|---|
| Profile | Houses information about users, fleets, vehicles, etc.. | 200,000 transactions | 100,000 MB |
| central control center | Houses status information about gateways, pims and their relationship | 400,000 transactions | 2,000 MB |
| transaction | Houses current trip sheet data, vehicle location information and other transactional information | 5,300,000 transactions | 100,000 MB |
| transaction 6 m | Houses historical tripsheet data after shifts and trips have been closed and settled | 400,000 transactions | 900,000 MB |
| Totals | | 6,300,000 transactions | 1,102,000 MB |

In order to accommodate the large amount of data, an extensible SAN is preferably used, such as the CX300 available from EMC Corporation of Hopkinton, Mass. It is configured with multiple SCSI Drives, with additional drive shelves easily added to expand storage as the data grows. Current drive volumes should be able to be extended without service interruption. The data is archived to tape in a manner so as to be recalled on an as needed basis for ad hoc SQL queries.

Figure 8:
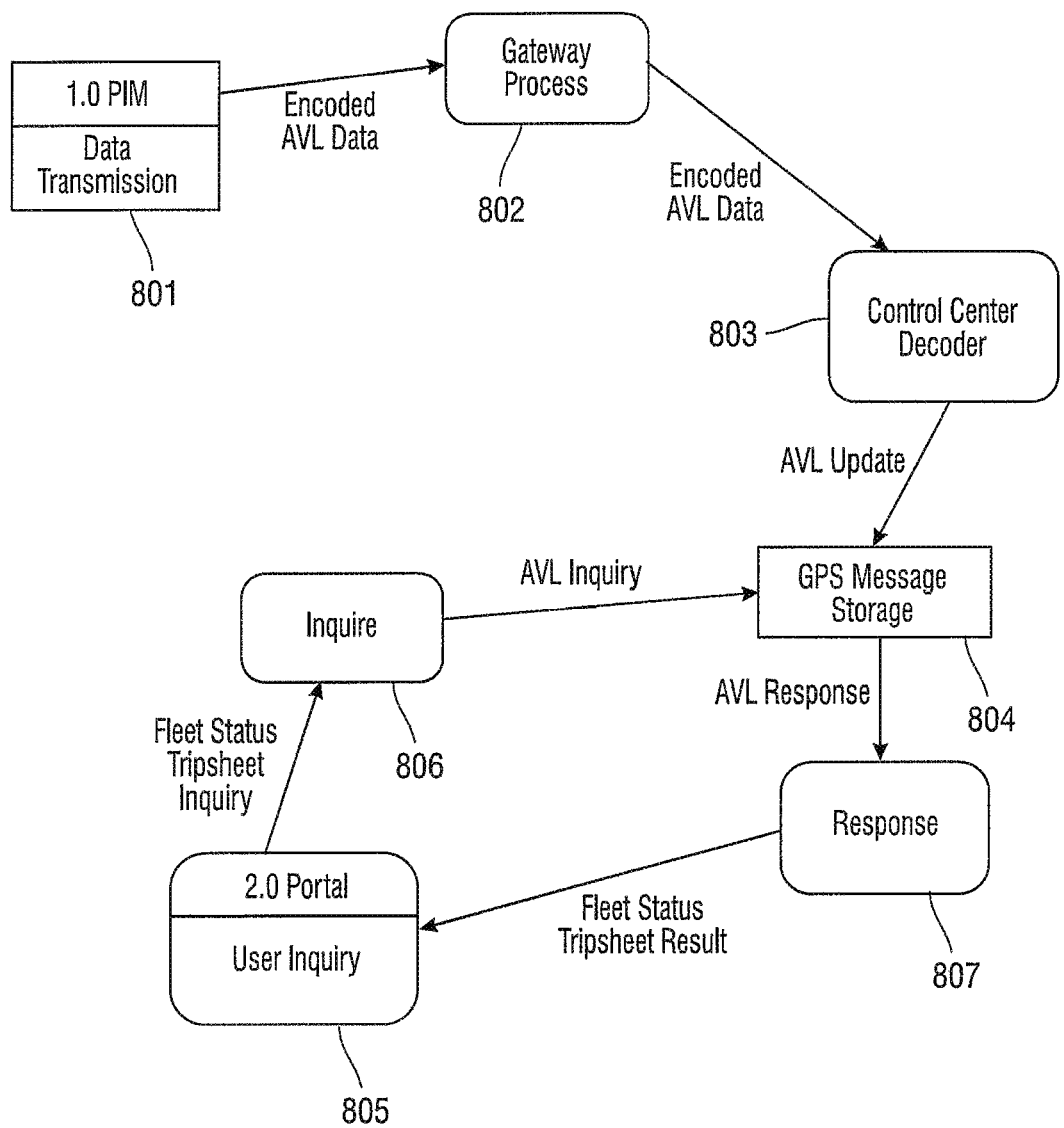
FIG. 8 is an example of the data flow for AVL in a preferred embodiment of the invention.

FIG. 8 shows how data for the automobile vehicle location (AVL) information flows from the PIM 220 through the gateway 20 to the central control center 10 and back. Every event that results in trip sheet data as shown in FIG. 6 also includes AVL information. In addition to those events, there are also frequent periodic AVL messages, each one of which contains AVL information for its respective point in time. The AVL messages are frequent enough to keep the wireless communication device 240 maintained in a communication session with gateway 20 through the wireless communication network. In this way, when a message is to be sent by the vehicle, it does not need to establish a communication session and the message can be sent without delay. Gateway 20 also monitors the communication session in this way, knowing that if a message hasn't been received in a certain period of time, the session has been lost and it has to establish a new communication session. This results in a unique bi-directional method of communication session control optimized for ensuring consistent receipt of AVL information.

The period between the AVL messages is also preferably dynamically variable depending on the number of cars in service and/or vehicle traffic. For example, if the vehicle is moving rapidly, the messages may be sent more rapidly, and if the vehicle is moving very slowly, the messages may be sent at the slowest period sufficient to maintain the communication session. AVL information is always periodically updated and collected. It can thus be made available as needed to a governmental or regulatory agency through the web portal. The web portal may maintain different user groups with different permissions. In particular, the AVL information is not necessarily always made available for use in fleet management reports. For example, the fleet manager may be precluded from coordinating credit card transaction data with trip data in order to safeguard the privacy of passengers in having their travels recorded.

The process for AVL information in FIG. 8 is quite similar to that for trip sheet data in FIG. 6. The beginning step 801 of the process is the transmission of encoded AVL data from the vehicle to the gateway. The AVL information is preferably encoded to provide an extra level of security. Even if someone attempts to intercept the data, such as by pretending to be the receiving gateway, the data will be encoded and hard to use even if obtained. At step 802, gateway 20 receives the AVL data, managing the communication session as indicated above, and passes the AVL data onto central control center 10. At step 803, central control center 10 decodes the data in the AVL update and stores it at step 804. The AVL data from this transmission and many other transmissions, and many other cars, is stored in its raw form, and is not organized at this point in time in the format that may later be used for a report.

Figure 11:
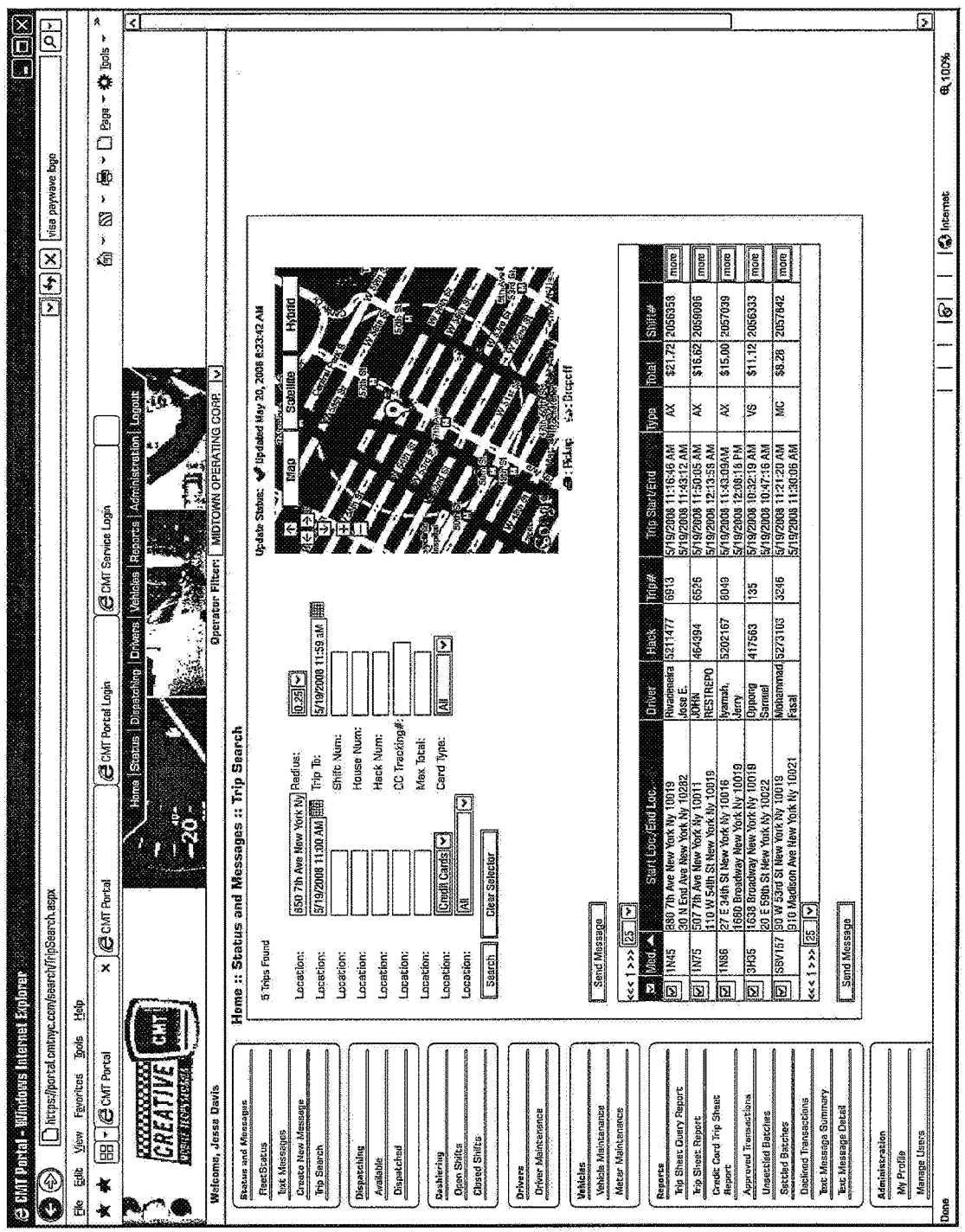
FIG. 11 is an example of a trip search for fleet vehicles by location in accordance with a preferred embodiment of the invention.

The AVL information can be used for an electronic trip sheet data (i.e., to show where trips started and ended). It also can be used for real-time or near real-time fleet status reports. When a fleet manager makes an inquiry on the web portal at step 805, a fleet status or trip sheet inquiry is created. This inquiry is processed at step 806 by the application cluster in central control center 10 and forwarded on to obtain the requisite data related to the inquiry stored at step 804. An AVL response containing the AVL data to be utilized is returned to central control center 10 at step 87070. Central control center 10 generates the fleet status or trip sheet result and sends it to web portal 805, which displays it to the fleet manager. The data is not formatted in the fleet status or trip sheet result sent from step 807. It is the web portal at step 805 that formats the data in the result and generates the electronic fleet status or trip sheet report. FIG. 11 is an example of status and location map for a vehicle fleet. The location of each vehicle is graphically shown on the map, the status is shown by a respective color (i.e., off-duty vehicles are shown in Red). When a vehicle icon is pointed to, such as with a cursor controlled by a mouse, a pop-window identifies the vehicle, driver and status as shown. The data is real-time or near real-time.

It should be kept in mind that AVL data is collected and stored frequently for every vehicle in the fleet at a high update rate. This is unlike trip sheet data or text message data, which typically is not updated and collected frequently. Furthermore, AVL data is more likely to be reported in real-time or near real-time. For a real-time or near real-time fleet status report, the status data and AVL data for each vehicle has to be available quickly, regardless of whether or not the vehicle is in service. Indeed, whether or not a vehicle is in service can be one of the most desired facts in a status report.

Thus, in the preferred embodiments, the latest status data and AVL data is not stored in the database along with the trip sheet data and text message data. Instead, a cache of the AVL data is stored in a memory resident status table in the central control center rather than database and is always quickly available. The web portal utilizes this stored information with web services, such as AJAX, to provide real-time or near real-time status reports. FIG. 11 is an example of a trip search for fleet vehicles by location. With this fleet manager tool, trip information can be queried for any vehicle that picked up or dropped off in a location on a map, within a preset radius.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of managing a plurality of vehicles in a fleet of vehicles operatively controlled by a fleet management system, the method comprising:

maintaining a plurality of wireless communication connections between the plurality of vehicles in the fleet and a central control center, each wireless communication connection operative between one or more of the plurality of vehicles and the central control center, via a cluster of gateways and a cluster of application switches, each wireless communication connection being maintained, at least in part, by messages initiated by each connected vehicle of the plurality of vehicles, wherein the central control center, the cluster of gateways, and the cluster of application switches handle a plurality of simultaneous wireless communication connections with the plurality of vehicles;

receiving a plurality of vehicle location messages at the central control center;

the plurality of vehicle location messages including information indicating the geographic location of a corresponding one of the plurality of vehicles in the fleet, in real-time or near real-time;

wherein the plurality of vehicle location messages are sent to the central control center frequently enough to maintain the wireless communication connections, wherein the central control center monitors the plurality of vehicle location messages and establishes a new communication session if a vehicle location message is not received within a predetermined time period, to ensure consistent receipt of the plurality of vehicle location messages;

load balancing using the messaging gateways of the cluster of messaging gateways to provide maximum communication uptime for the plurality of vehicles, while only one messaging gateway of the cluster of messaging gateways is visible to any single vehicle of the plurality of vehicles, at a given time;

wherein, based on current load conditions, one or more of the cluster of application switches determines which messaging gateway of the cluster of gateways is to maintain the wireless communication connections between a specific vehicle of the plurality of vehicles and the central control center, such that additional messaging gateways are included when the load conditions increase;

collecting and storing the plurality of vehicle location messages and additional messages at the central control center;

receiving, by the central control center, a polling communications from the plurality of vehicles; and sending, by the central control center, updates to the plurality of vehicles based on the received polling communications.

2. The method of claim 1, further including:

displaying, by a fleet management tool or report, an electronic trip sheet having a first template and a second template, wherein:

the first template and the second template are designated by a user;

the first template contains information directed to a fleet manager, the information having only productivity patterns to assist with improving day-to-day operations and improving revenues;

the second template contains information concerning a selected driver of a vehicle;

wherein the first and second templates provide different information; and at least one of the first and second templates is based on the additional messages sent by the at least one vehicle and collected and stored at the central control center.

3. The method of claim 1, wherein the polling communications includes a software version identifier, an advertising version identifier, and an operating parameter.

4. The method of claim 1, wherein the information in the plurality of vehicle location messages indicating the geographic location is stored in a database in association with information indicating the times at which the plurality of vehicle location messages were received.

5. The method of claim 2, wherein the fleet management tool or report is a graphical map indicating the locations of the plurality of vehicles in the fleet.

6. The method of claim 2, wherein the fleet management tool or report includes an electronic trip sheet.

7. The method of claim 6, wherein the user designates the extent of information included in the electronic trip sheet.

8. A fleet management central control center, the central control center comprising:

a communication gateway adapted to maintain a plurality of simultaneous wireless communication connections with a respective plurality of vehicles in a fleet, and to receive a plurality of vehicle location messages at the central control center;

each of the vehicle location messages including information indicating the geographic location of a corresponding one of the plurality of vehicles in the fleet in real-time or near real-time;

the communication gateway being among a cluster of gateways, wherein the cluster of gateways is in communication with a central control center and in communication with the plurality of vehicles, under the control of a cluster of application switches;

the cluster of application switches configured to facilitate load balancing use of the cluster of gateways to ensure maximum communication uptime for the plurality of vehicles, while only one of messaging gateway of the cluster of gateways is visible to any one of the plurality of vehicles at a given time;

wherein based on current load conditions, one or more of the cluster of application switches determines which communication gateway of the cluster of gateways is to maintain the wireless communication connection between selected vehicles of the plurality of vehicles and the central control center, such that additional messaging gateways are included when the load conditions increase;

wherein the plurality of vehicle location messages are sent to the central control center frequently enough to maintain the wireless communication connections, and the central control center monitors the plurality of vehicle location messages and establishes a new communication session if the plurality of vehicle location messages are not received within a predetermined time period to ensure consistent receipt of the plurality of vehicle location messages;

wherein the communications gateway receives an additional message from one of the plurality of vehicles indicating details of trips, and receives polling communications from the plurality of vehicles, the polling communications being initiated by the vehicles, and wherein the communication gateway sends updates to the plurality of vehicles based on the received polling communications; and a database configured to collect and store the plurality of vehicle location messages and the additional messages at the central control center.

9. The central control center of claim 8, wherein the information in the plurality of messages indicating the geographic location is stored in the database in association with information indicating the times at which the messages were received.

10. The central control center of claim 8, further including a fleet management tool or report having a graphical map indicating the locations of the plurality of vehicles in the fleet.

11. The central control center of claim 10, wherein the fleet management tool or report includes an electronic trip sheet.

12. The central control center of claim 11, wherein a user designates the extent of information included in the electronic trip sheet.

13. The central control center of claim 12, wherein the user designates two different templates for the electronic trip sheet, wherein a first template includes information for a fleet manager, and a second template includes information for the driver of a vehicle.

14. A non-transitory, tangible medium storing a software program product, the software program product, when executed by a computer, causes the computer to carry out functions utilizing real-time location information in a fleet management system, the functions comprising:
maintaining a plurality of simultaneous wireless communication connections between a respective plurality of vehicles in a fleet and a central control center, each wireless communication connection operative between one or more of the plurality of vehicles and the central control center, via a cluster of gateways and a cluster of application switches, each wireless communication connection maintained by a plurality of messages initiated by vehicles of the plurality of vehicles;
receiving a plurality of messages at the central control center;
each of the messages including information indicating the geographic location of a corresponding one of the plurality of vehicles in the fleet in real-time or near real-time;
wherein the plurality of messages are sent to the central control center frequently enough to maintain the wireless communication connections, and the central control center monitors the plurality of messages and establishes a new communication session if the plurality of messages are not received within a predetermined time period to ensure consistent receipt of the plurality of messages;
load balancing using the messaging gateways of the cluster of messaging gateways to provide maximum communication uptime for the plurality of vehicles, while only one of the cluster of messaging gateways is visible to any single vehicle of the plurality of vehicles at a given time;
wherein based on current load conditions, one or more of the cluster of application switches determines which messaging gateway of the cluster of gateways is to maintain the wireless communication connections between a specific vehicle of the plurality of vehicles and the central control center, such that additional messaging gateways are included when the load conditions increase;
collecting and storing the plurality of messages in the central control center;
receiving polling communications from the plurality of vehicles, the polling communications being initiated by the vehicles; and
sending updates to the plurality of vehicles based on the received polling communications.

15. The tangible medium of claim 14, wherein information in the plurality of messages indicating the geographic location is stored in a database in association with information indicating the times at which the messages were received.

16. The tangible medium of claim 14, further including displaying, by a fleet management tool or report, based on additional messages details of the trips, an indication of power on/off, driver log on/off, and meter status.

17. The tangible medium of claim 16, wherein the fleet management tool or report is a graphical map indicating the locations of the plurality of vehicles in the fleet.

18. The tangible medium of claim 16, wherein the fleet management tool or report comprises an electronic trip sheet.

19. A fleet management system utilizing real-time location, comprising:
a central control center operatively coupled with a communication gateway, the communication gateway being among a cluster of gateways, wherein the cluster of gateways is in communication with the central control center and the plurality of vehicles under the control of a cluster of application switches;
the cluster of application switches configured to facilitate load balancing use of the cluster of gateways to ensure maximum communication uptime of the plurality of vehicles, while only one of messaging gateway of the cluster of gateways is visible to any one of the plurality of vehicles at a given time;
wherein based on current load conditions, one or more of the cluster of application switches determines which communication gateway of the cluster of gateways is to maintain the wireless communication connection between selected vehicles of the plurality of vehicles and the central control center, such that additional messaging gateways are included when the load conditions increase;
a wireless communication device within a vehicle, wherein the wireless communication device maintains at least, in part, a wireless communication connection between the vehicle and the central control center;
a passenger information monitor within the vehicle and in communication with the central control center through the wireless communication device, wherein the passenger information monitor provides information to the passenger, and wherein the central control center processes all inbound and outbound communications with the passenger information monitor; and
a driver interactive unit within the vehicle configured to permit a driver to log onto and off of the fleet management system, wherein the driver interactive unit includes an interface that allows the driver to interact with the passenger information monitor.

20. The fleet management system of claim 19, wherein the information provided to the central control center includes details of trips and fares of the vehicle provided from the driver interactive unit.

21. The fleet management system of claim 19, wherein the central control center is configured to generate a report based on the information received from the passenger information monitor, and wherein the report contains details of trips and fares of the vehicle.

* * * * *